July 12, 1955  B. T. SANDOR  2,712,905
COMBINED DISINTEGRATOR AND BLOWER UNIT
Filed Oct. 3, 1951  3 Sheets-Sheet 1

INVENTOR:
BELA THOMAS SANDOR
BY: Chatwin & Company
ATTYS.

July 12, 1955    B. T. SANDOR    2,712,905
COMBINED DISINTEGRATOR AND BLOWER UNIT
Filed Oct. 3, 1951    3 Sheets-Sheet 2

INVENTOR:—
BELA THOMAS SANDOR
BY: Chatwin & Company
ATTYS.

July 12, 1955     B. T. SANDOR     2,712,905
COMBINED DISINTEGRATOR AND BLOWER UNIT
Filed Oct. 3, 1951     3 Sheets-Sheet 3

INVENTOR:
BELA THOMAS SANDOR
BY: Chaturn & Company.
ATTYS.

United States Patent Office 2,712,905
Patented July 12, 1955

2,712,905

COMBINED DISINTEGRATOR AND BLOWER UNIT

Bela Thomas Sandor, London, England

Application October 3, 1951, Serial No. 249,455

3 Claims. (Cl. 241—101)

This invention relates to disintegrators, such as hammer mills, its main object being to provide means whereby the disintegrator is combined with a blower which is so arranged that it can, without alteration, be used to blow to one or other of independent discharge points either material treated in the disintegrator, or untreated material fed into the blower itself, or again untreated material blow by the blower to one or other of separate de- the air-stream created thereby.

According to the present invention, the combined disintegrator and blower unit comprises a disintegrator, a motor for driving said disintegrator, a blower casing having a fan driven by the motor and having an inlet and an outlet, a duct mounted on the disintegrator and blower casing and serving to direct disintegrated material from the disintegrator into the inlet of the blower casing, means for feeding material into said duct without passage through the disintegrator, and a two-way valve connected to the outlet of the blower casing for directing the material blown by the blower to one or other of separate delivery points.

In order that the invention may be more fully understood, it is shown by way of example in the accompanying drawings, wherein.

Figure 1:
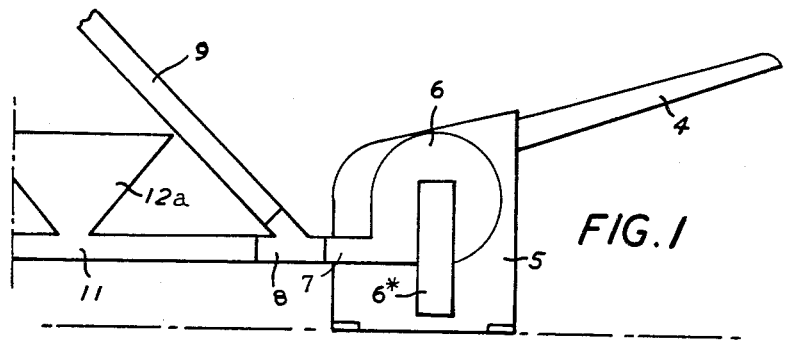
Figure 1 is a side elevation of a hammer mill and blower only, showing hopper means for feeding material into the outlet trunking for the blower.
Figure 2:
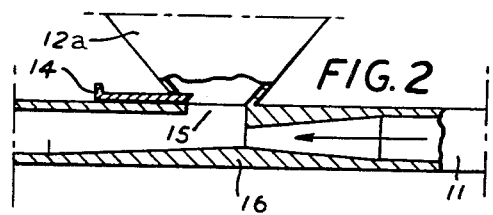
Figure 2 shows, in partial section and to an enlarged scale, a detail of the feeding means of Fig. 1.

In Figs. 1 and 2, material to be treated is fed onto a chute 4 leading to a hammer mill 5 the outlet of which is connected to a blower 6 by a duct 6*. 7 is an outlet for the blower leading to a two-way valve 8 which is hereinafter described in more detail with reference to Fig. 3. One trunking 9 from the valve 8 can lead to a meal-bin or other receptacle (not shown), and the other trunking 11 therefrom can also lead to a feed bin (not shown). Material is passed into the hammer mill 5 where it is ground and then sucked out by the blower 6. It is then blown through the valve 8 and trunking 9 to a suitable storage means. For use of the same apparatus as a conveyor only, without the material risking damage by passage through the blower, the material may be fed into the hopper 12a leading, past a shutter 14, through an entry hole 15 into a suitable part of a venturi-like tube 16 which is connected in the outlet of the blower. Operation of the valve 8 will cause the air stream to pass through the tube 16.

Figure 3:
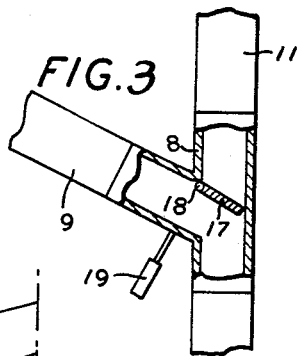
Figure 3 shows, in partial section and to an enlarged scale, a detail of an adjustable air flap for directing the air stream of the blower.

The two-way valve 8 used for directing the air current through one or other of the trunkings is shown in greater detail in Fig. 3 wherein 17 is a flap or shutter carried in pivotal manner on a spindle 18 at the junction of the trunkings and serving to direct the air current wholly into one or other of the trunkings. 19 is any suitable form of external handle for operating and fixing the flap or shutter 17 in the required position.

Figure 4:
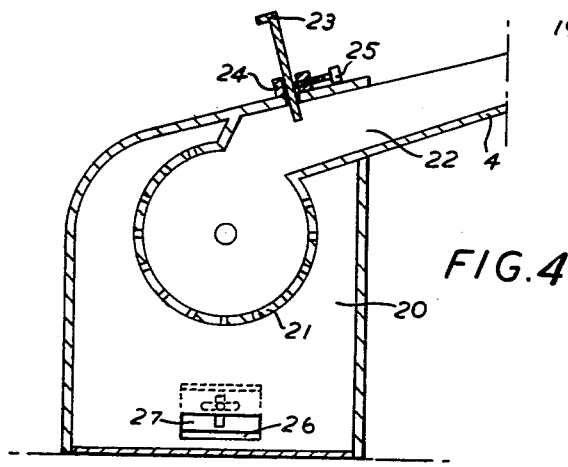
Fig. 4 shows, to an enlarged scale and schematically, details of two air inlets of the hammer mill.

Figure 4 shows details of the air inlet controls of the hammer mill, only the casing 20, screen 21, and chute 4 of which are illustrated. The inlet to the hammer mill comprises a passage 22 into which the material passes by gravity and by suction of the fan from the chute 4. This passage 22 can be partially or wholly closed by a transversally-slidable shutter 23 which is carried in a suitable mount 24 and which can be secured in any desired position of closing by a thumb-screw 25. The shutter 23 can be completely closed when it is not desired to use the hammer mill, or completely or partially closed if the blower is to receive its air supply otherwise than through the main inlet of the hammer mill, or if the air supply is to be restricted.

There is sometimes a tendency for the ground material to clog in parts of the casing of the hammer mill and for the purpose of loosening such clogging there is provided in the casing a secondary air inlet 26 having an adjustable cover 27 which can be opened to allow a blast of air to enter the lower part of the casing to clear the clogged material therefrom.

In Figures 5 to 10, 35 is a disintegrator from the base of which an outlet tube 36 leads to the inlet of a blower 37. Both the movable members of the disintegrator and the fan of the blower are mounted on a common shaft 38 carrying a pulley 39 used for driving purposes. 40 is a chute and 41 is a hopper for feeding the disintegrator.

The blower may be arranged to be rotatable about its axis so that its outlet 42 can be arranged at various angles, conveniently between 30° and 60° and preferably 45°. To the outlet 42 is connected a two-way valve 43 having a direct outlet passage 44 and a deflected outlet passage 45 into one or other of which the material passing through the valve is directed by means of a pivoted valve-member 46 controlled by a suitable handle 47. The direct outlet passage 44 has a constriction 48 followed by a relative widening 49 forming a venturi-like tube serving for the better induction of grain or other material through an inlet 50 controlled by a slidable gate or the like 51 and leading from a hopper 52.

The deflected outlet passage 11 leads through a vertical trunking 53 to the upper end of a "Cyclone" bagging device 54.

The blower and disintegrator are driven by means of a belt 55 passing round the pulley 39 and a power driven pulley 56 provided in known manner at the rear of a tractor 57. The disintegrator and blower are carried on a metal frame having uprights 58 connected by horizontal bars 59.

The upper of the horizontal bars 59 has a bracket 60 which receives the usual "top-link" 61 of the tractor engaged therein by means of a removable pin 62. The "lower-links" 63 of the tractor are connected one to each side of the frame and are again secured by means of removable pins to permit uncoupling. 64 and 65 are stabilising arms (shown only in Figs. 5 and 6, and omitted in Fig. 10 to reveal the positioning of the lower link 63)

which prevent horizontal swinging of the apparatus. The lower links 63 are connected by arms 66 to cranks 67 which are power-driven and can be used to raise the members of the power lift into the position shown in broken lines in Fig. 10, whereby the complete assembly of the blower and disintegrator is lifted clear of the ground.

The support frame has other horizontal members 68 extending rearwardly, and on which the disintegrator is mounted. These members 68 are provided with longitudinal slots 69 which with transverse slots 70, respectively permit adjustment of the belt tension and alignment of the pulley of the disintegrator, which latter is bolted thereto by means of bolts 71. For the purpose of moving the disintegrator along the members 68, there is provided a manually-operated set-screw 72 screw-threaded through the frame.

It will be seen that if the disintegrator 35 is raised by means of the power lift, the belt 55 will become slack and all adjustments altering the position of the disintegrator can then easily be carried out.

It will be obvious from the drawing that by disconnection of the upper link 61 and the two lower links 63, the disintegrator 35 and blower 37 will be completely disconnected from the tractor and can be used as a stationary machine if desired.

In operation, the blower 37 can be used firstly for blowing materials fed into the disintegrator 35 and treated therein, said materials passing through the outlet tube 36 to the blower 37 and being subsequently ejected via the valve 43 and thence either through the direct outlet passage 44 to a desired delivery point or through the deflected outlet passage 45 to the bagging device 54.

Secondly the blower 37 can be used to blow air through the valve 43 and direct outlet passage 44 for the purpose of conveying materials fed into the inlet 50 from the hopper 52 and controlled by the gate 51.

Figure 5:
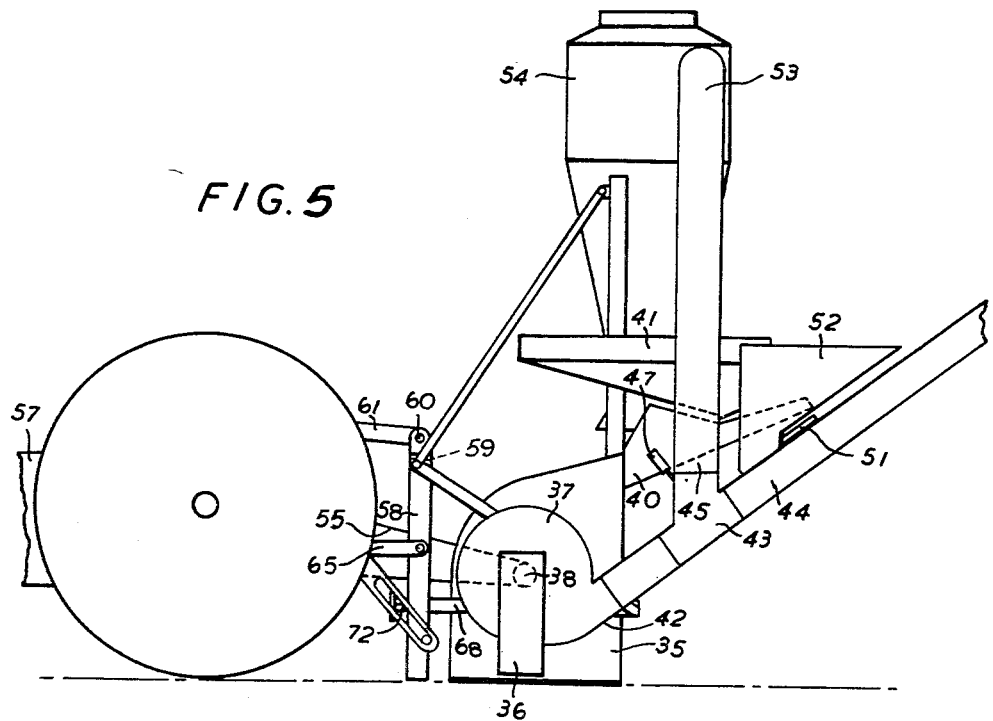
Figure 5 is a side elevation of a combined blower and disintegrator mounted on the power lift of a tractor.
Figure 6:
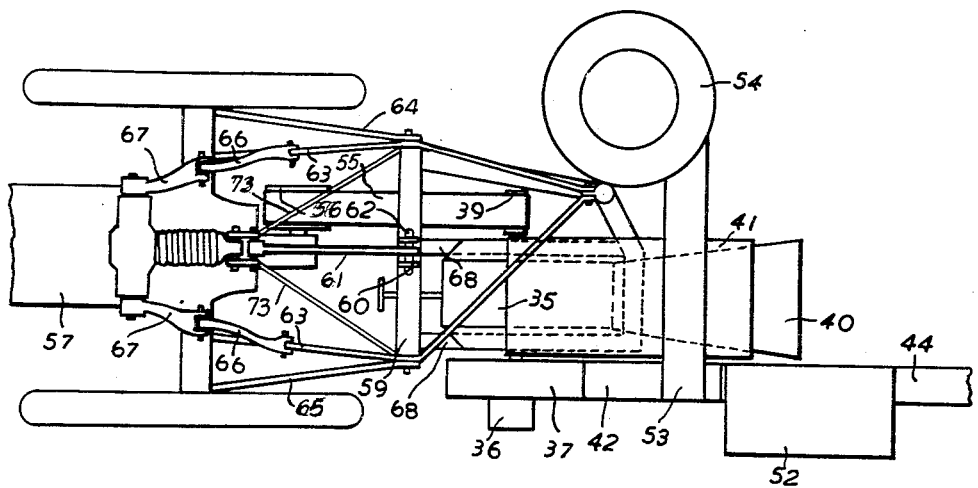
Figure 6 is a corresponding plan view.
Figure 7:
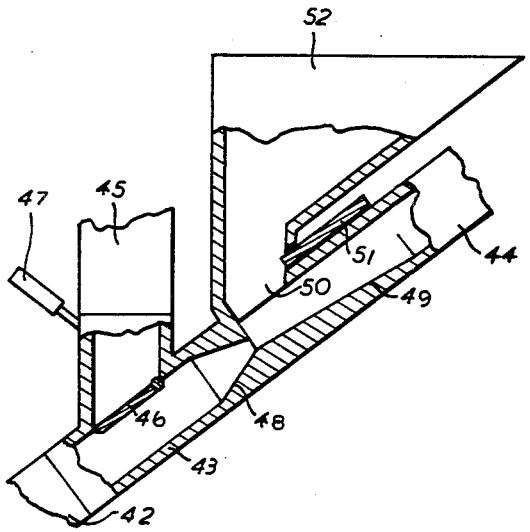
Figure 7 is a side elevation, with part shown in section, of a two-way valve with venturi-like tube and grain feed hopper.
Figure 8:
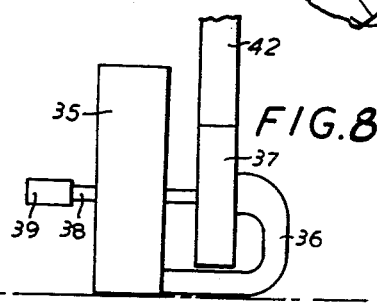
Figure 8 is an end elevation of the blower and disintegrator to show the air connection therebetween.
Figure 9:
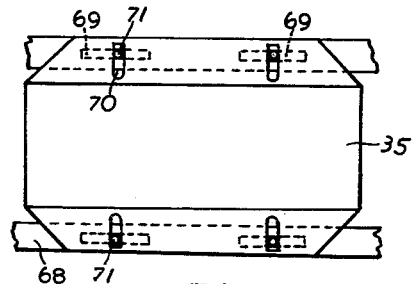
Figure 9 is a plan view of the disintegrator alone to show its adjustable manner of mounting.
Figure 10:
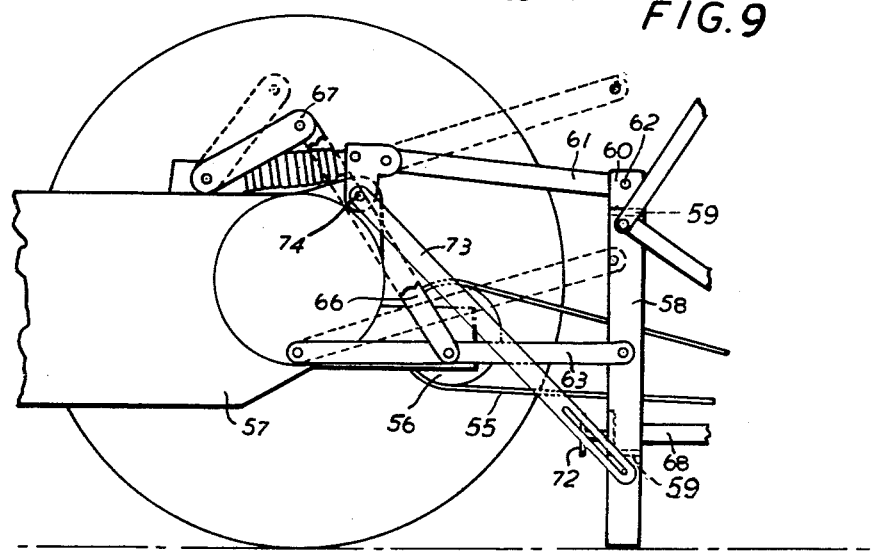
Figure 10 is a side elevation of the power lift of the tractor to show the manner in which the frame for the blower and disintegrator is connected thereto.

73 is one of a pair of check links (both of which are shown in Fig. 6 and one of which is shown in Figs. 5 and 10) which are secured at their upper ends on an extended pin 74 on the tractor, and at their lower ends to the uprights 58. Instead of the extended pin 74, the check links could be adjustably attached to the tractor at their top ends by means for instance of a rack device or the like.

I claim:

1. A combined disintegrator and blower unit comprising a rotary disintegrator having an inlet and an outlet, a rotary blower having an inlet and an outlet and having driving connection with the disintegrator, the inlet of the blower being connected to the outlet of the disintegrator, a two-way valve connected to the outlet of the blower and having two outlets, two separate trunkings connected one to each of the outlets of the two-way valve, and a venturi-tube inlet device arranged in one of the trunkings for feeding material into said trunking without passage through the blower.

2. A combined disintegrator and blower unit comprising a rotary disintegrator having an inlet and outlet, a rotary blower having an inlet and an outlet and having driving connection with the disintegrator, the inlet of the blower being conected to the outlet of the disintegrator, a two-way valve connected to the outlet of the blower and having two outlets, two separate trunkings connected one to each of the outlets of the two-way valve, a venturi-like inlet device arranged in the first of said trunkings for feeding material thereinto without passage through the blower, and an air-separating and bagging device connected at the delivery end of the second trunking.

3. A combined disintegrator and blower unit comprising a rotary disintegrator having an inlet and an outlet, a rotary blower having a casing and a fan in driving connection with the disintegrator, said casing having an inlet connected to the outlet of the disintegrator and an outlet and being adjustable about the axis of rotation of the fan for directing the blower outlet at a desired angle, a two-way valve connected to the outlet of the blower and having two outlets, two separate trunkings connected one to each of the outlets of the two-way valve, and a venturi-tube inlet device arranged in one of the trunkings for feeding material into said trunking without passage through the blower.

References Cited in the file of this patent

UNITED STATES PATENTS

| 694,803 | Strittmater | Mar. 4, 1902 |
| --- | --- | --- |
| 826,459 | Wilder | July 17, 1906 |
| 1,241,935 | Dellert | Oct. 2, 1917 |
| 1,350,691 | Williams | Aug. 24, 1920 |
| 1,789,583 | Elderkin | Jan. 20, 1931 |
| 1,792,841 | Iglehart | Feb. 7, 1931 |
| 1,798,814 | Shelton | Mar. 31, 1931 |
| 1,861,471 | Frickey | June 7, 1932 |
| 2,092,102 | Wilson | Sept. 7, 1937 |
| 2,217,568 | Shirley | Oct. 8, 1940 |
| 2,316,124 | Sheldon | Apr. 6, 1943 |
| 2,475,382 | Erickson | July 5, 1949 |
| 2,500,031 | Hall | Mar. 7, 1950 |

FOREIGN PATENTS

| 634,487 | Great Britain | Mar. 22, 1950 |
| --- | --- | --- |
| 640,880 | Great Britain | Aug. 2, 1950 |